P. MacGAHAN.
AUTOMATIC SYNCHRONIZER.
APPLICATION FILED JULY 26, 1906.

968,579.

Patented Aug. 30, 1910.

2 SHEETS—SHEET 1.

WITNESSES:
C. L. Belcher
Otto S. Schairer

INVENTOR
Paul MacGahan
BY
Wesley G. Carr
ATTORNEY

P. MacGAHAN.
AUTOMATIC SYNCHRONIZER.
APPLICATION FILED JULY 26, 1906.

968,579.

Patented Aug. 30, 1910.
2 SHEETS—SHEET 2.

WITNESSES:
C. L. Belcher
Otto S. Schairer

INVENTOR
Paul MacGahan
BY
Kelley S. Carr
ATTORNEY

UNITED STATES PATENT OFFICE.

PAUL MacGAHAN, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC SYNCHRONIZER.

968,579.  Specification of Letters Patent.  Patented Aug. 30, 1910.

Application filed July 26, 1906. Serial No. 327,836.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Automatic Synchronizers, of which the following is a specification.

My invention relates to means for automatically connecting an alternating current generator to a circuit when the currents generated thereby agree in phase and frequency with those in the circuit.

The object of my invention is to provide a more simple and effective arrangement of the circuits for means of the character indicated than has heretofore been provided.

In Patent 819,787, granted May 8, 1906, to Westinghouse Electric & Manufacturing Company, as assignee of Hugh J. McMahan, is set forth a device for so governing the operation of switches that are adapted to connect two or more alternating current generators in parallel that closure of the coupling switches may be effected at substantially the instant when the machines reach synchronism. The device includes a switch, for controlling the coupling switches, that comprises two movable contact members and a stationary contact member that coöperate, and one or more actuating windings for the movable members. As illustrated in the said patent, the currents in the actuating windings are the resultants of the currents that are supplied by the generator being synchronized and that in the secondary winding of a transformer the primary winding of which is supplied from the circuit to which it is desired to connect the generator. According to the present invention, the circuits of the actuating windings are so arranged and simplified that auxiliary transformers may be dispensed with and also so that no direct connection exists between the generator being brought to synchronism and the circuit to which it is to be connected.

Figure 1:
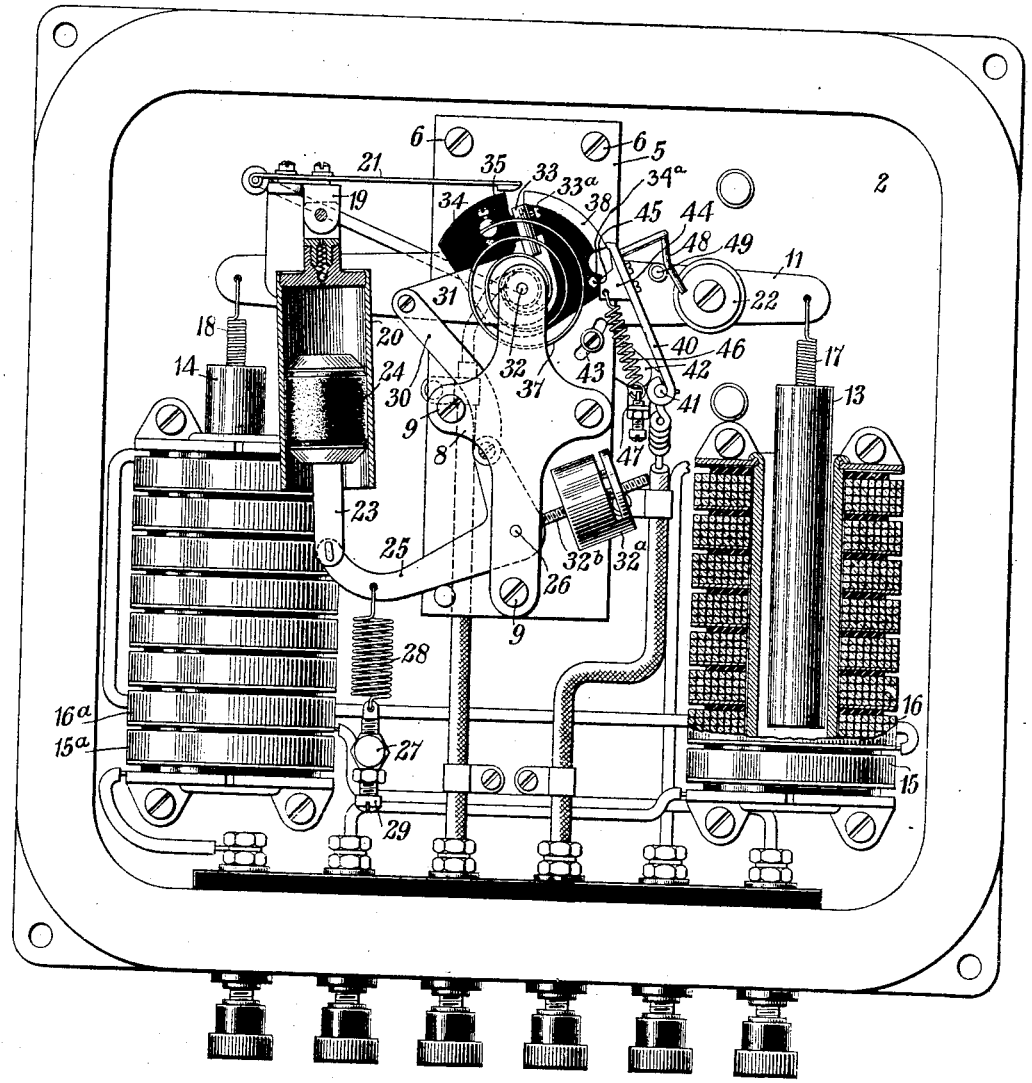
Figure 2:
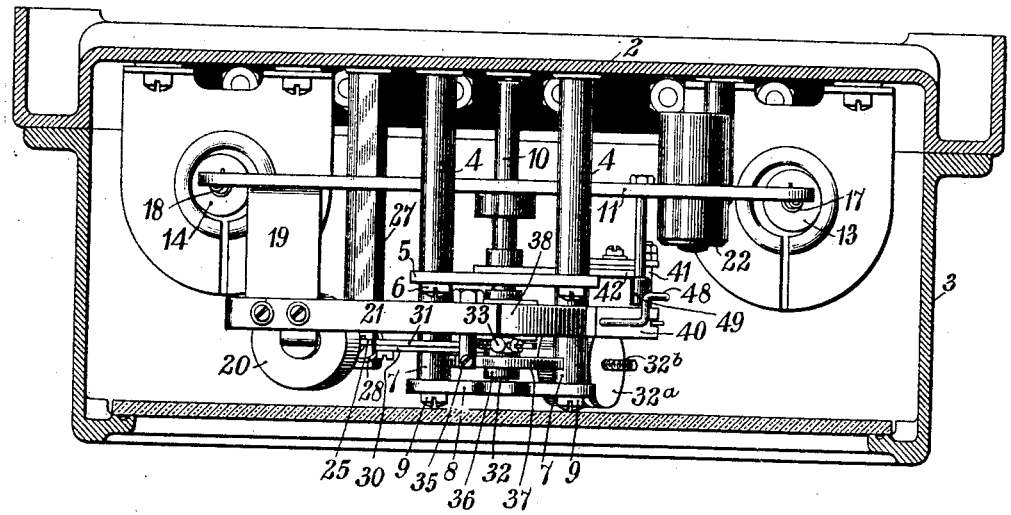
Figure 3:
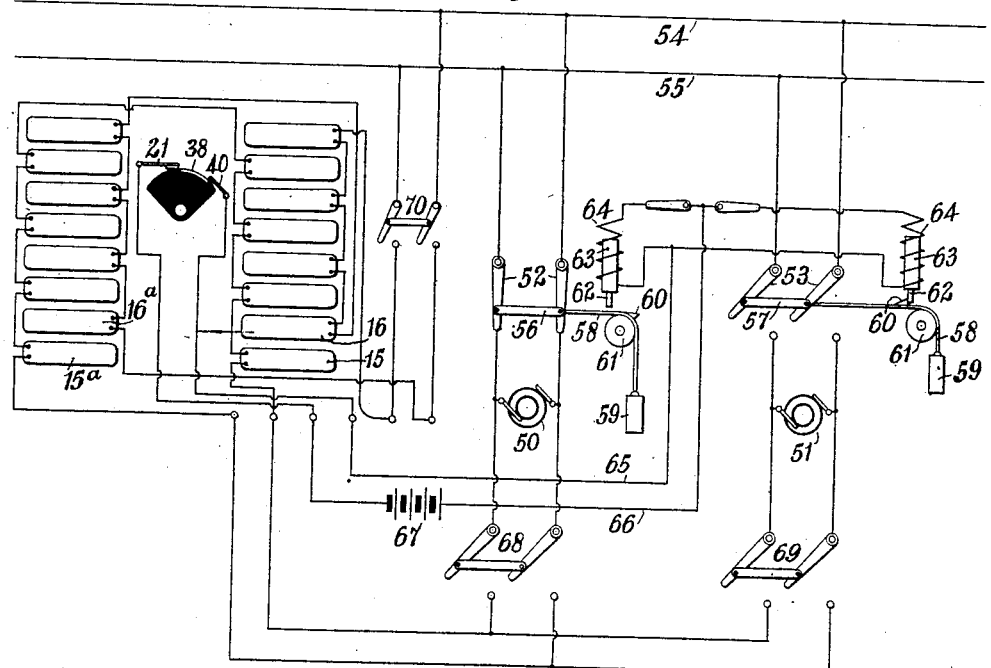

Figure 1 of the accompanaying drawing is a view, in front elevation, of a device that embodies my invention, the cover for the device having been removed. Fig. 2 is a plan view of the device of Fig. 1, the casing being shown in section, and Fig. 3 is a diagrammatic view illustrating the circuit connections of the device of the preceding figures and the mode of operation thereof.

The structure of the device to which the invention is here applied is substantially like that which forms the subject-matter of the aforesaid Patent No. 819,787, the operating parts of which are mounted upon a back plate or base 2 and are inclosed and protected by a cover 3 which may be suitably fastened to the base 2. Projecting forwardly from the base 2 are a plurality of posts 4, to the outer ends of which is fastened a frame plate 5, by means of screws 6. The frame plate 5 is also provided with a plurality of posts 7, to the outer ends of which is fastened a plate 8, by means of screws 9.

The parts thus far described constitute the frame which supports the movable parts of the instrument.

Journaled in suitable bearings, one of which is attached to the base 2 and the other to the frame plate 5, is a shaft 10, upon which is rigidly mounted an arm or bar 11 that projects therefrom in both directions. The outer ends of the arm or bar 11 are respectively connected to magnetizable cores 13 and 14 by means of coil-springs 17 and 18, so that, as either core is drawn downward, the corresponding end of the arm or bar 11 will be lowered to correspondingly rock the shaft 10 in its bearings. The magnetizable core 13 is subjected to the influence of two sets of series-connected coils 15 and 16 that alternate in position and are so arranged as to act in conjunction upon the core 13 when the currents which traverse them are of the same phase. The core 14 is similarly subjected to the influence of two sets of series-connected coils $15^a$ and $16^a$ that alternate in position, but are so arranged as to act in opposition when the currents which traverse them are of the same phase, coils $15^a$ being connected in series with the coils 15 and coils $16^a$ in series with coils 16.

The end of the bar 11 that is connected to the solenoid core 14 is provided with an angular bracket arm 19, the free end of which is pivotally connected to the upper end of a dash-pot cylinder 20. The bracket arm 19 is also provided with a contact brush 21 that projects inwardly substantially parallel to the base 2 toward the rock shaft 10. The end of the bar 11 that is connected to the solenoid core 13 is provided with a suitable weight 22 to counterbalance the dash-pot cylinder 20 and the other parts which are supported by the corresponding end of the bar 11.

The rod 23 of the dash-pot piston 24 is pivotally connected to one end of a bell crank lever 25 that is supported on a short shaft or pivot 26 which has its bearings in the plates 5 and 8. The end of the lever 25 to which the piston rod 23 is connected is also connected to a post 27 that projects from the base 2, by means of a coil-spring 28, a screw 29 being provided for adjusting the amount of pull exerted by the spring. The other end of the lever 25 is connected, by means of a link 30, to the outer end of an arm 31 which is loosely mounted upon a short shaft 32, the respective ends of which are journaled in the frame plate 5 and the plate 8. The weights of the links and levers are counterbalanced by means of a weight $32^a$ that is adjustable in position upon a screw-threaded rod $32^b$ which forms an extension of one arm of the bell crank lever 25. The portion of the arm 31, adjacent to the shaft 32, is provided with a pin 33 in the outer end of which a screw $33^a$ is threaded.

Rigidly mounted upon the shaft 32, between the plates 5 and 8, is a segmental block 34, preferably formed of insulating material and provided with a pin 35, that is adapted to engage the end of the screw $33^a$. The pin 35 is connected to a hub 36 of the arm 31, by means of a spiral spring 37 which tends to move the segmental block 34 from left to right and, consequently, to hold the pin 35 in engagement with the screw $33^a$. The periphery of the segmental block 34 is provided with a conducting plate or strip 38, the outer surface of which is substantially flush with the peripheral surface of the block at one end, and at the other end the block is cut away to provide an offset, as indicated at $34^a$.

The brush contact member 21, to which reference has already been made, makes engagement at its free end with the periphery of the segmental block 34 and a similar brush contact member 40 is pivotally mounted upon a pin 41 at the end of an arm 42 adjustably supported by means of a slot and screw connection 43 with the frame plate 5, so that it may be adjusted to vary the position of the free end of the brush 40 with reference to the contact strip or plate 38 with which the segmental block 34 is provided.

Secured to the lower side of the brush contact member 40, and near its free end, is a block 44 that is adapted to engage a pin or stop 45 which projects from the face of the segmental block 34, when the member 40 becomes disengaged from the conducting strip 38. A helical tension spring 46, the ends of which are secured, respectively, to the block 44 and to a post 47 upon the arm 42, causes the contact member 40 to exert sufficient pressure upon the conducting strip 38 to insure good electrical connection between those parts. Projecting from the upper side of the contact member 40, near its free end, is a hook or catch 48 with which a post 49 that is carried by the bar 11 is adapted to engage when the right-hand end of the bar is raised, the contact member 40 being thereby raised in order to cause the block 44 to become disengaged from the stop 45 and to permit reëngagement thereof with the conducting strip 38.

Referring now to Fig. 3, in connection with the preceding figures, two alternating current machines 50 and 51, which may be assumed as indicative of any number of generators, rotary converters or synchronous motors which it may be desired to connect in parallel to either supply or utilize alternating current energy, are respectively provided with double pole switches 52 and 53 by means of which the machines may be connected to bus bars 54 and 55. It will be understood that the bus bars 54 and 55 may be connected, by means of suitable conductors, to translating devices, in the usual manner, and that it is therefore unnecessary to illustrate such translating devices and circuit connections. I have shown each of the switches 52 and 53 as provided with means for automatically closing the same, such means being intended merely as indicative of any suitably operated devices for this purpose. As here shown, the movable contact members of the switch 52 are connected together by a bar 56 and the corresponding members of the switch 53 are similarly connected together by a bar 57. Each pair of movable members is connected, by means of a cord or band 58, to a weight 59, the cord or band being provided with a catch or stop device 60 and being guided and supported by a suitable roller 61. The switches are normally held in open position by reason of the engagement with the catches 60 of projections 62 from cores 63 of solenoids 64, these projections being withdrawn to permit the weights 59 to close the switch when the solenoids are energized to raise their cores. The solenoids 64 are connected, in parallel, to a normally open circuit 65—66 that is supplied with energy from a suitable source, such as a battery 67.

The brushes 21 and 40 of the controller constitute the terminals of the battery circuit and that circuit is therefore closed only when both brushes are in contact with the strip or plate 38 of the segmental block 34.

This condition is attained when and only when the machines 50 and 51 attain synchronous operation, and this condition may be brought about by the arrangement of connections constituting the present invention.

The coils 15 and 15ᵃ are adapted to be connected to the one or the other of the generators 50 and 51 by means of double throw switches 68 and 69, and the coils 16 and 16ᵃ are adapted to be connected to the bus bars 54 and 55 by means of a double throw switch 70. Thus it is seen that one set of coils for each of the magnetizable cores 13 and 14 is adapted to be supplied from the circuit 54—55, and that each of the other sets of coils is adapted to be supplied from the generator which it is intended to connect to said circuit. It will also be understood that when the currents in the two sets of coils are in phase with each other; that is, when the currents supplied by the generator are in phase with the currents in the circuit 54—55, the right-hand end of the bar 11 will be drawn downward, and when the currents are not in phase, the left-hand end of the bar will be drawn downward. The remainder of the operation of the device is substantially like that of the aforesaid patent except that when the currents agree in phase, but differ considerably in frequency, the core 13 will be quickly drawn downward and the segmental block 34 will be moved from right to left a greater distance than that through which it ordinarily moves, thus permitting the free end of the brush 40 to become disengaged therefrom and also permitting the block 44 to engage the stop 45. The brush 40 is, in this manner, locked in position out of engagement with the conducting strap 38 until the pin 49 engages the hook 48 and releases the block 44 from engagement with the stop 45. This action cannot take place, however, until the brush 21 becomes disengaged from the conducting strip 38. Thus the device prevents connection of the generator to the bus bars when the currents differ materially in frequency even though they agree in phase.

If desired, an electro-magnet core may be attached to one end of the bar 11 and a spring to the other end, as indicated in one of the figures of the aforesaid patent, in which case, alternate coils of the electro-magnet winding may be arranged to act either in conjunction or in opposition when the currents in the circuit and in the generator that is to be connected thereto agree in phase.

The structural details and the combinations and arrangements of circuits and connections which I have shown and described may be varied in many particulars without departing from my invention, and I therefore desire to include within the scope of my claims, all such variations and modifications as do not materially change the mode of operation or result.

I claim as my invention:

1. The combination with an alternating current circuit, an alternating current generator, and means for connecting the generator to said circuit, of means for insuring operation of said connecting means when the currents in the generator agree in phase with those in the circuit, said means comprising two solenoids each having two windings, those of one solenoid being arranged to act in opposition and those of the other to act in conjunction when the currents in the windings agree in phase.

2. The combination with an alternating current circuit, an alternating current generator, and means for connecting the generator to said circuit, of means for insuring operation of said connecting means when the currents in the generator agree in phase with those in the circuit, said means comprising two solenoids each having two windings supplied respectively from the circuit and from the generator, the windings of one solenoid being arranged to act in opposition and those of the other to act in conjunction when the currents therein are of the same phase.

3. The combination with an alternating current circuit, an alternating current generator, and means for connecting the generator to said circuit, of means for insuring operation of said connecting means when the currents in the generator agree in phase with those in the circuit, said means comprising two windings supplied, respectively, from the circuit and from the generator, each of said windings comprising a plurality of coils disposed in two side-by-side groups and alternating in position with the coils of the other winding to form two composite solenoids, cores for said solenoids, and mechanical means for connecting said cores together in opposing relation.

4. The combination with an alternating current circuit, an alternating current generator, and means for connecting the generator to said circuit, of means for insuring operation of said connecting means when the currents in the generator agree in phase with those in the circuit, said means comprising two windings supplied respectively from the circuit and from the generator and each divided into a plurality of coils and arranged in two groups, alternate coils of which belong to the respective windings and act in opposition in one group and in conjunction in the other.

5. The combination with an alternating current circuit, an alternating current generator, and means for connecting the generator to said circuit, of means for insuring operation of said connecting means when the currents in the generator agree in phase with those in the circuit, said means comprising two solenoids each of which has two sets of alternately disposed coils supplied, respectively, from the circuit and from the generator, and two cores which are mechanically connected together to act in opposition.

6. The combination with an alternating current circuit, an alternating current generator, and means for connecting the generator to said circuit, of a switch for governing the operation of said means, two controlling windings each of which comprises two sets of alternately disposed and series-connected coils supplied, respectively, from the circuit and from the generator, movable armatures for said windings and means for mechanically connecting said armatures together to control said switch.

7. The combination with an alternating current circuit, an alternating current generator, and means for connecting the generator to said circuit, of means for insuring operation of said connecting means when the currents in the generator agree in phase with those in the circuit, said means comprising two solenoids one of which has two sets of alternately disposed coils respectively supplied from the circuit and from the generator to act in opposition and the other of which has two alternately disposed coils respectively supplied from the circuit and from the generator to act in conjunction.

8. The combination with an alternating current circuit, an alternating current generator, and means for connecting the generator to said circuit, of means for insuring operation of said connecting means when the currents in the generator agree in phase with those in the circuit, said means comprising two solenoids each of which has two sets of alternately disposed coils, those of one solenoid being respectively connected in series to the circuit and to the generator to act in opposition and those of the other being respectively connected in series to the circuit and to the generator to act in conjunction.

In testimony whereof, I have hereunto subscribed my name this 10th day of July, 1906.

PAUL MacGAHAN.

Witnesses:
   WM. BRADSHAW,
   BIRNEY HINES.